UNITED STATES PATENT OFFICE.

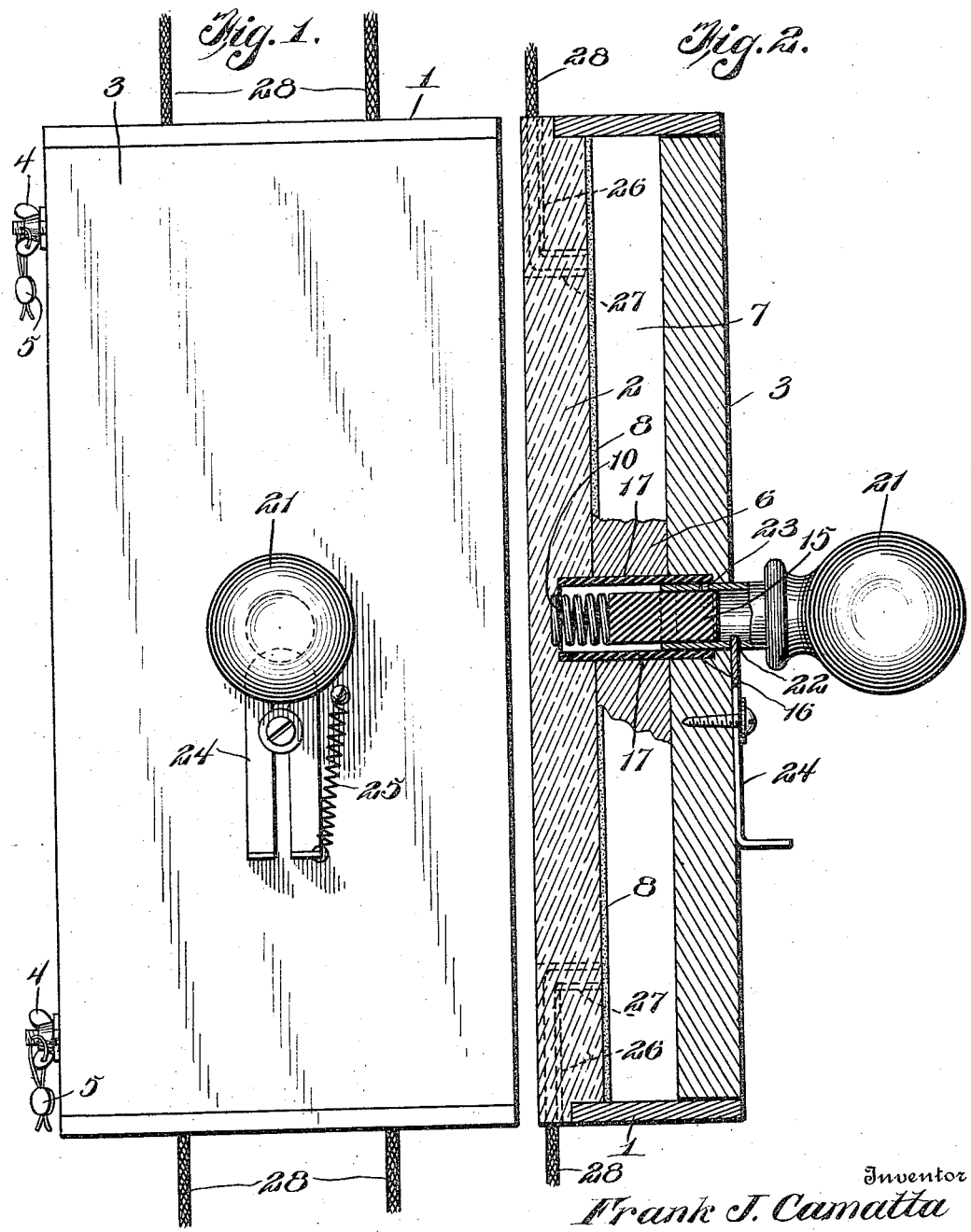

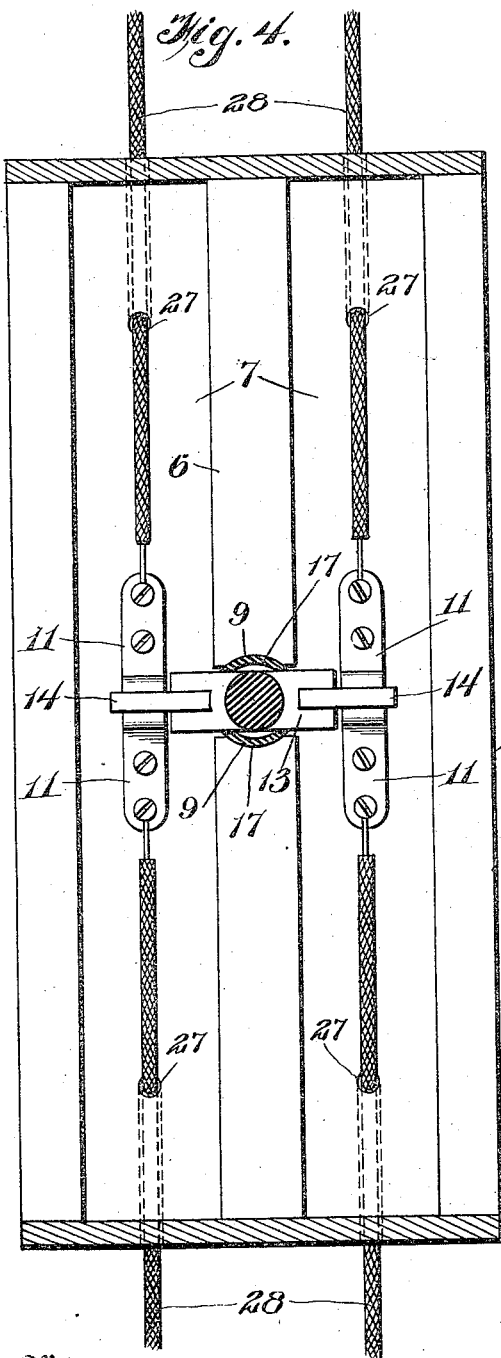
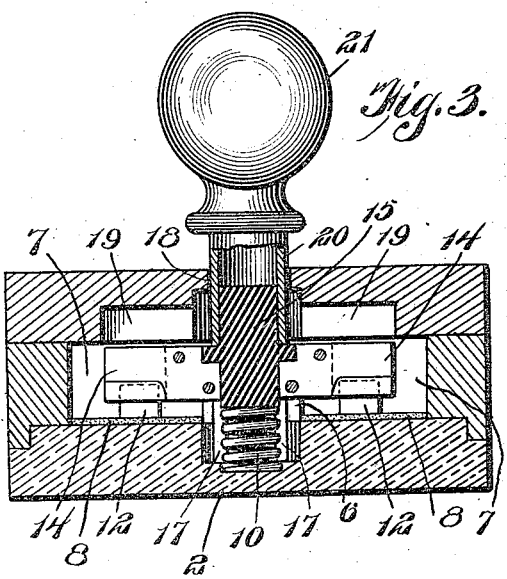
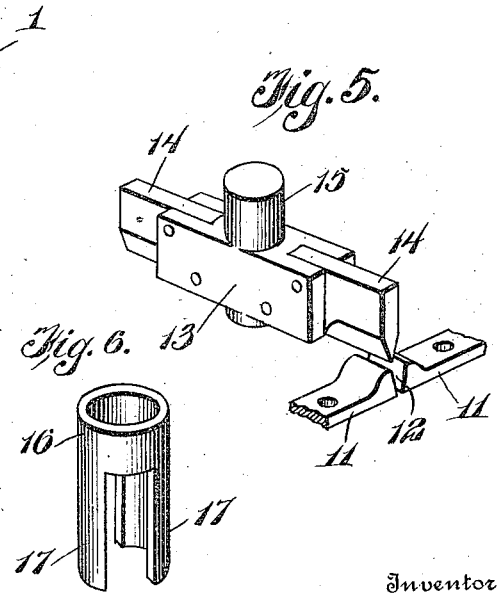

FRANK J. CAMATTA, OF TONASKET, WASHINGTON.

ELECTRIC-CIRCUIT-CONTROLLING SWITCH.

1,267,181.  Specification of Letters Patent.  Patented May 21, 1918.

Application filed February 7, 1916, Serial No. 76,842. Renewed April 10, 1918. Serial No. 227,822.

*To all whom it may concern:*

Be it known that I, FRANK J. CAMATTA, a citizen of the United States, residing at Tonasket, Washington, formerly of Missoula, in the county of Missoula and State of Montana, have invented new and useful Improvements in Electric-Circuit-Controlling Switches, of which the following is a specification.

This invention relates to improvements in electric circuit controlling switches and has particular application to a cut-out switch for use in connection with electric current meters.

In carrying out the present invention, it is my purpose to provide a cut-out switch for use in connection with electric current meters, which will be constructed in such manner as to prevent unlawful tapping of the switch, thereby preventing the consumer from taking the current from the mains around the meter.

It is also my purpose to provide a switch of the class described which will operate efficiently and effectively under all conditions, which will embrace the desired features of simplicity, efficiency and durability, which may be manufactured and installed at small cost and which may be quickly and conveniently operated to open and close the controlled circuit.

With the above and other objects in view, the invention consists in the construction, combination and arrangement of parts hereinafter set forth in and falling within the scope of the claim.

In the accompanying drawings;

Figure 1 is a plan view of a switch constructed in accordance with the present invention.

Fig. 2 is a longitudinal sectional view therethrough.

Fig. 3 is a transverse sectional view through the same.

Fig. 4 is a horizontal sectional view through the switch.

Fig. 5 is a perspective view of the blades.

Fig. 6 is a perspective view of the insulating collar of the invention.

Referring now to the drawings in detail, 1 designates a substantially rectangular casing constructed of any suitable material and having the bottom wall thereof fastened to a slab 2. The front of the casing 1 is closed by means of a cover 3 secured to the forward edges of the side wall and to the end wall by suitable securing devices 4 and by seals 5. Arranged within the casing 1 and extending longitudinally thereof is a partition 6 disposed centrally of the casing and having the opposite ends thereof secured to the respective end walls and this partition divides the casing into two longitudinal channels 7. These channels are preferably, although not necessarily, lined with asbestos 8 or analogous material. Formed in the partition 6 centrally thereof is a bore 9 opening onto the sides of the partition at diametrically opposite points and arranged within the bore is an expansion spring 10 engaging the rear wall of the casing and secured to the back walls of the channels 7 respectively are pairs of contact blocks 11. The blocks of each pair are arranged end to end and the confronting ends thereof are suitably spaced apart and beveled to form a wedge-shaped space 12 between the blocks. The spaces 12 between the blocks in the respective channels aline with each other and with the bore and arranged transversely of the bore 19 and engaging the spring 10 is a block 13 of insulating material having the opposite ends thereof projecting beyond the sides of the partition and suitably secured to the opposite ends of the block are blades 14 respectively adapted to enter the spaces 12 between the pairs of contact blocks 11. Each blade 14 is wedge-shaped in cross section so that the same may fit snugly within the corresponding space 12 and tightly engage the confronting ends of the pair of contacts so as to form a good electrical connection between such blocks. Formed on the forward edge of the insulating block 13 is an outwardly projecting stud 15 and encircling the stud 15 is an insulating collar 16 having the rear edge thereof formed, at diametrically opposite points, with strips 17 curved in cross section and fitting within the bore 9. Formed in the cover 3 in alinement with the bore 9 in the partition is an opening 18, while formed in the under surface of the cover at diametrically opposite sides of the opening 18 and contiguous to such opening are grooves 19 adapted to receive the blades 14, and passed through the opening 18 is a sleeve 20 preferably, although not necessarily, formed of insulating material and disposed within the collar 16 and encircling the stud 15. Secured to the outer end of the sleeve 20 is a knob 21, while formed in the sleeve immediately adjacent to the knob is a slot 22 and disposed in the plane below the slot 22 is another slot 23 formed in the sleeve, while slidably mounted upon the outer surface of the cover is a latching finger 24 adapted to engage in either one of the slots 22 or 23, according to the position of the sleeve. This finger 24 is connected with a spring 25 that acts to hold the finger normally in latching position.

In practice, the spring 10 acting upon the block 13 holds the blades 14 normally within the grooves 19 and out of engagement with the contact blocks 11 and in this position of the blades the lower slot 23 in the sleeve 20 registers with the finger 24 and receives the finger so as to hold the blades against inward movement in the event of the accidental operation of the sleeve under the action of the knob. When it is desired to close the switch, the knob is rotated to revolve the sleeve and in the rotation of the sleeve the latching finger 24 is forced out of the slot 23 so that the knob may be pressed inwardly and in the inward movement of the knob the insulating block 13 is actuated against the action of the spring 10 and the blades 14 carried into engagement with the contact block 11, thereby bridging the spaces between the contact blocks of the pairs to electrically connect such blocks. When the blades are in engagement with the contact blocks, the slots 22 register with the finger 24 and the spring 25 forces the finger 24 into the slot 22 so as to lock the switch in circuit closing position.

In the present instance, the back wall of the casing 1 is formed with grooves 26 that communicate by way of passages 27 respectively with the channels 7 and pass through these grooves 26 and corresponding passages 27 are wires 28 connected with the respective contact blocks 11. The wires 28 connected with corresponding contact blocks 11 are adapted to be connected to the electric current mains, while the wires connected to the other contact blocks are adapted to be connected to the meter.

It will be seen that I have provided a cut-out switch which will be especially useful in connection with electric current meters and wherein the contact blocks and blades of the switch are inclosed so that unlawful tapping of the switch is prevented.

While I have herein shown and described one preferred form of my invention by way of illustration, I wish it to be understood that I do not limit or confine myself to the precise details of construction herein described and delineated, as modification and variation may be made within the scope of the claim and without departing from the spirit of the invention.

I claim:

An electric switch comprising an inclosing casing having a transverse recess in the under side of its top wall, a longitudinal partition dividing the interior of said casing into two channels, a pair of separated contact members in each of said channels, said partition and the bottom wall of said casing being provided with a bore alining with said recess, a spring disposed in said bore, a sleeve disposed in said bore around said spring and provided with slots, a block of insulating material slidable in said sleeve and projecting through said slots, contact blades on said block adapted to bridge said separated contact members, said spring urging said block and said blades into said recess out of engagement with said contact members, an operating handle connected with said block and extending exteriorly of the casing, and means for holding said blades selectively in and out of engagement with said contact members.

In testimony whereof I affix my signature in presence of two witnesses.

FRANK J. CAMATTA.

Witnesses:
L. C. BOLTON,
O. B. WHITE.

Copies of this patent may be obtained for five cents each, by addressing the "Commissioner of Patents, Washington, D. C."